(12) United States Patent
Kalnins et al.

(10) Patent No.: US 12,227,279 B2
(45) Date of Patent: Feb. 18, 2025

(54) ELECTRIC MARINE PROPULSION SYSTEM AND CONTROL METHOD

(71) Applicant: Brunswick Corporation, Mettawa, IL (US)

(72) Inventors: Jared D. Kalnins, Neenah, WI (US); Mitchell J. Baer, Fond du Lac, WI (US); Corey L. Bruno, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 429 days.

(21) Appl. No.: 17/574,284

(22) Filed: Jan. 12, 2022

(65) Prior Publication Data

US 2023/0219676 A1     Jul. 13, 2023

(51) Int. Cl.
*B63H 21/21*     (2006.01)
*B60L 15/20*     (2006.01)
*B60L 58/12*     (2019.01)
*B63H 21/17*     (2006.01)

(52) U.S. Cl.
CPC .............. *B63H 21/21* (2013.01); *B60L 15/20* (2013.01); *B60L 58/12* (2019.02); *B63H 21/17* (2013.01); *B60L 2200/32* (2013.01); *B60L 2240/12* (2013.01); *B60L 2240/421* (2013.01); *B60L 2240/54* (2013.01); *B60L 2250/16* (2013.01)

(58) Field of Classification Search
CPC ......... B63H 21/21; B63H 21/17; B60L 58/12; B60L 15/20; B60L 2200/32; B60L 2240/12; B60L 2240/421; B60L 2240/54
See application file for complete search history.

(56) References Cited

U.S. PATENT DOCUMENTS

| | | |
|---|---|---|
| 6,507,164 B1 | 1/2003 | Healey et al. |
| 6,652,330 B1 | 11/2003 | Wasilewski |
| 6,885,919 B1 | 4/2005 | Wyant et al. |
| 6,902,446 B1 | 6/2005 | Healey |
| 7,218,118 B1 | 5/2007 | Gonring |
| 7,385,365 B2 | 6/2008 | Feick |

(Continued)

FOREIGN PATENT DOCUMENTS

| | | |
|---|---|---|
| JP | 2021054353 A | 4/2021 |
| KR | 101202336 B1 | 2/2012 |

OTHER PUBLICATIONS

Torqeedo GmbH, Travel 503, 1003 S/L, 1003, 1103 CS/CL, https://media.torqeedo.com/downloads/manuals/torqeedo-Travel-manual-DE-EN.pdf, p. 82, accessed Jan. 4, 2022.

(Continued)

*Primary Examiner* — Peter D Nolan
*Assistant Examiner* — Wae L Louie
(74) *Attorney, Agent, or Firm* — Andrus Intellectual Property Law, LLP

(57) ABSTRACT

A method of controlling an electric marine propulsion system configured to propel a marine vessel includes receiving a user-set distance, identifying a battery charge level of a power storage system on a marine vessel and identifying an energy utilization value. An output limit is then determined based on a remaining distance, the battery charge level, and the energy utilization value. The propulsion system is then automatically controlled so as to not exceed the output limit, enabling the marine vessel to travel the user-set distance without recharging the power storage system.

21 Claims, 7 Drawing Sheets

(56) References Cited

U.S. PATENT DOCUMENTS

| | | | |
|---|---|---|---|
| 10,048,082 B2* | 8/2018 | Meyer | G01C 21/3469 |
| 10,678,234 B2* | 6/2020 | Sun | G05D 1/0005 |
| 10,807,460 B2* | 10/2020 | Lor | B60W 20/15 |
| 11,584,396 B2* | 2/2023 | Cussigh | B60W 60/0011 |
| 11,740,098 B2* | 8/2023 | Maeda | B60L 58/12 |
| | | | 701/22 |
| 11,851,011 B2 | 12/2023 | Ledden et al. | |
| 11,920,940 B2* | 3/2024 | Cun | B60L 53/11 |
| 11,940,278 B2* | 3/2024 | Davis | B63B 49/00 |
| 2012/0053772 A1* | 3/2012 | Lu | B60L 1/02 |
| | | | 903/903 |
| 2013/0166123 A1* | 6/2013 | Donald, III | B60L 58/12 |
| | | | 701/22 |
| 2016/0097652 A1* | 4/2016 | Liu | G01C 21/3469 |
| | | | 701/423 |
| 2019/0143831 A1 | 5/2019 | Birek et al. | |
| 2020/0070801 A1* | 3/2020 | Staats | B60L 53/53 |
| 2021/0129963 A1* | 5/2021 | Sargazikoosheh | B63B 79/10 |
| 2022/0009605 A1 | 1/2022 | Ledden et al. | |
| 2023/0054361 A1* | 2/2023 | Kirchhoff | B60L 15/20 |
| 2023/0219675 A1* | 7/2023 | Janeczko | B60L 58/12 |
| | | | 440/6 |
| 2023/0219676 A1* | 7/2023 | Kalnins | B60L 15/20 |
| | | | 701/21 |
| 2023/0294521 A1* | 9/2023 | Kalnins | B60L 58/14 |
| | | | 701/22 |
| 2024/0059386 A1* | 2/2024 | Kalnins | B63H 21/17 |

OTHER PUBLICATIONS

Guangdon ePropulsion Technology Limited, Spirit 1.0 Evo User Manual, https://media.torqeedo.com/downloads/manuals/torqeedo-Travel-manual-DE-EN.pdf, p. 32, accessed Jan. 4, 2022.

EP 23151220, Extended European Search Report, dated Jun. 16, 2023, 43 pages.

* cited by examiner

ELECTRIC MARINE PROPULSION SYSTEM AND CONTROL METHOD

FIELD

The present disclosure generally relates to marine propulsions systems, and more particularly to electric marine propulsion systems having electric motors and methods for controlling power utilization thereof.

BACKGROUND

The following U.S. Patents provide background information and are incorporated herein by reference, in entirety.

U.S. Pat. No. 6,507,164 discloses a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameters, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,652,330 discloses a method for controlling the electrical system of a marine vessel which comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,885,919 discloses a process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 6,902,446 discloses a DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

U.S. Pat. No. 7,218,118 discloses a method for monitoring the condition of a battery of a marine propulsion system provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 7,385,365 discloses a method for error detection of a brushless electric motor, where at least one first motor parameter is measured or determined, and a second, estimated motor parameter is estimated on the basis of the first motor parameter. The second, estimated motor parameter is compared to a second, measured or determined motor parameter. An error of the electric motor can be found out according to the comparison.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling an electric marine propulsion system configured to propel a marine vessel includes receiving a user-set distance, determining a remaining distance based on the user-set distance, identifying a battery charge level of a power storage system on a marine vessel and identifying an energy utilization value. An output limit is then determined based on the remaining distance, the battery charge level, and the energy utilization value. The propulsion system is then automatically controlled so as to not exceed the output limit, enabling the marine vessel to travel the user-set distance without recharging the power storage system.

In one example, the output limit includes a maximum motor torque.

In one example, the output limit includes a maximum motor RPM.

In one example, the output limit includes a maximum motor current.

In one example, the output limit includes a maximum motor power.

In one example, the output limit includes a maximum vessel speed.

In one example, the output limit includes a maximum helm demand and controlling the propulsion system so as not to exceed the output limit includes limiting a demand instruction to the maximum helm demand.

In one example, the energy utilization value is a filtered power draw value based on power drawn from the power storage system over time.

In one example, determining the output limit includes determining an expected distance based on the energy utilization value, the battery charge level, and a vessel speed. The method may further include determining a distance error as a difference between the use-set distance and the expected distance, wherein the output limit is determined based on the distance error to inhibit the expected distance from becoming less than the remaining distance. In certain examples, a distance error alert may be displayed on a user interface display when the expected distance is less than the remaining distance.

In certain examples, a user input to engage a distance control mode may be required prior to determining the output limit.

In certain examples, an electric marine propulsion system is configured to execute the foregoing method embodiments and examples.

In one embodiment, an electric marine propulsion system is configured to propel a marine vessel and includes a power storage system, at least one electric motor powered by the power storage system and a control system. The control system is configured to receive a user-set distance, determine a remaining distance based on the user-set distance, identify a battery charge level, identify an energy utilization value, and determine an output limit based on the remaining distance, the battery charge level, and the energy utilization value to enable the marine vessel to travel the user-set distance without recharging the power storage system. An output mitigation action is generated based on the output limit.

In certain examples, the control system is configured to require user input to engage a distance control mode prior to determining the output limit.

In certain examples, the output limit includes at least one of a maximum motor RPM of the at least one electric motor or a maximum vessel speed.

In a further example, the system includes a user interface display and the output mitigation action includes controlling the user interface display to instruct a user controlling the propulsion system to not exceed at least one of the maximum motor RPM or the maximum vessel speed.

In one example, the control system is further configured to automatically control the propulsion system, and the output mitigation action includes controlling the propulsion system so as not to exceed the output limit. For example, controlling the propulsion system so as not to exceed the output limit may include controlling the electric motor so as not to exceed a maximum motor RPM, a maximum motor torque, a maximum motor current, and/or a maximum motor power. Alternatively or additionally, in one example automatically controlling the propulsion system so as not to exceed the output limit includes limiting a demand instruction to a maximum helm demand.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
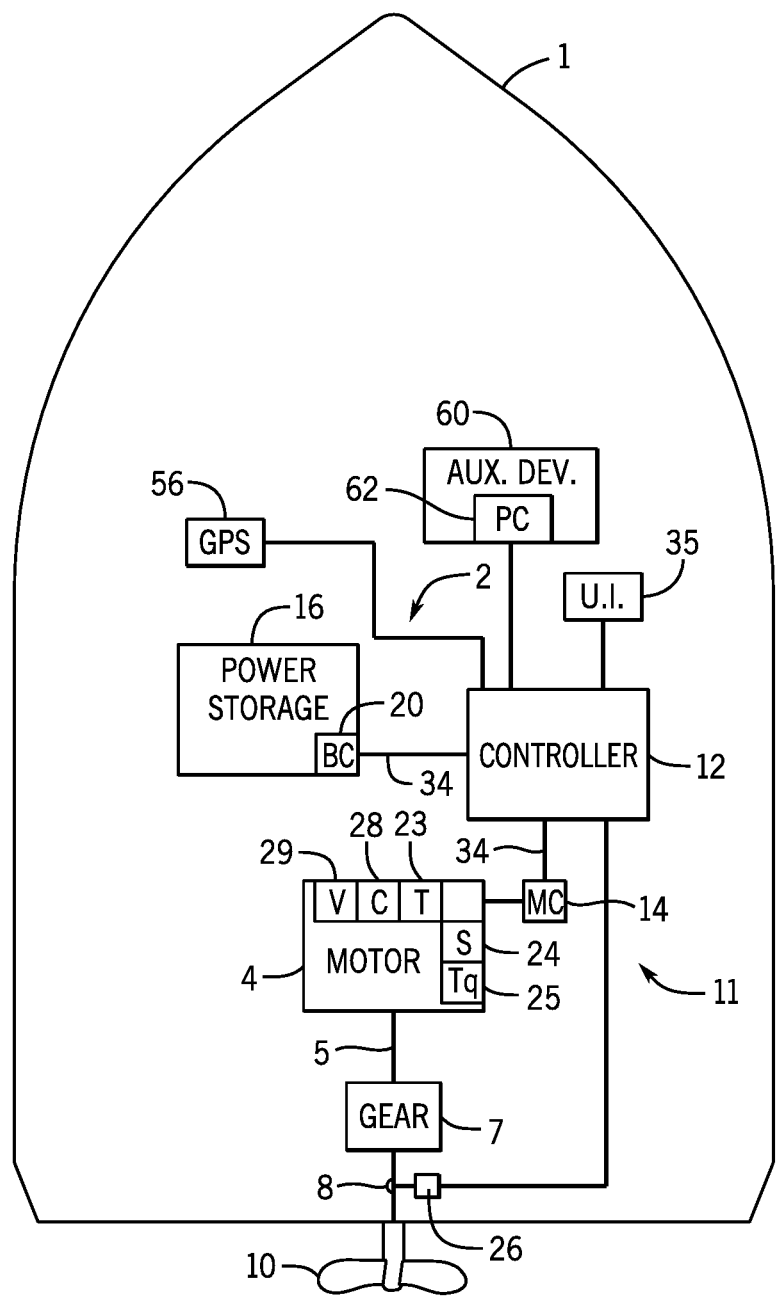
FIG. 1 is a schematic depiction of a marine vessel having an exemplary electric marine propulsion system in accordance with the present disclosure.

The present inventors have recognized that electric marine propulsion poses additional challenges and safety concerns as compared to electric propulsion for land vehicles. One such challenge that is magnified for marine propulsion is that of battery range and effectively managing range anxiety and battery utilization for users of marine vehicles. Being stranded in a body of water due to insufficient battery is concerning for a user of a marine vessel, and tends to be more so than for a user of a land vehicle because the user cannot easily exit the vessel and may not be in a situation to easily access help. For this reason, users report having increased anxiety when operating electric marine propulsion systems, and particularly may have heightened concerns regarding maintaining sufficient battery power to reach their destination and/or reach shore. Accordingly, the inventors developed the disclosed system and method that assists the user in utilizing battery power for an electric marine propulsion system that includes functions and safety features to prevent a user from inadvertently or unknowingly running it out of battery power during operation.

Based on recognition of the foregoing problems and challenges in the relevant art, the inventors developed the disclosed system and method of controlling an electric marine propulsion system to enable the marine vessel to travel a user-set distance without recharging the power storage system. The disclosed system and method are configured to facilitate a user to input a desired distance or a desired destination or route, and to determine an output limit based on the user input. In one embodiment, the output limit is determined based on the user-set distance, or a remaining distance where the distance traveled is subtracted from the user-set distance, a battery charge level of the power storage system on the marine vessel, and a current energy utilization value, such as a power draw or current draw on the battery. In one embodiment, a distance error may be calculated between the user-set distance or the remaining distance and the current rate of power consumption on the marine vessel. The output limit is then calculated based on the distance error to inhibit the expected distance based on the current rate of power consumption from becoming less than the remaining distance so that the marine vessel can travel the user-set distance without running out of battery power.

In various embodiments, the output limit may be effectuated as a maximum value that sets a limit for the rate of power consumption on the marine vessel, such as limiting the propulsion device so as to limit the power consumed for propelling the marine vessel. The output limit may be effectuated as a maximum motor torque, a maximum motor speed (RPM), a maximum motor current or motor power consumed by one or more electric motors in the propulsion system, a maximum demand instruction permitted, a maximum vessel speed, or the like. In various embodiments, the output limit may be automatically effectuated by the control system on the marine vessel such that the propulsion system is controlled so as not to exceed the output limit.

For example, the one or more electric motors or the power delivered thereto may be limited by the control system to enable the marine vessel to travel the user-set distance. For example, the control system may be configured to automatically limit the motor torque output or the motor RPM to a maximum determined output limit, which is effectuated as a cap on the motor output effectuated based on user demand. Thus, where user demand, such as demand percent based on helm lever position, is high, only a portion of the user demand within the output limit may be effectuated to conserve battery power as necessary. The system may be configured to generate an alert to the user when the user demand is exceeding the output limit to advise a user that only a portion of their demanded output from the motor is being effectuated.

In other embodiments, the system may be configured to instruct a user via a user interface to not exceed the output limit. For example, the system may be configured to instruct a user on controlling a propulsion system to not exceed a maximum motor RPM and/or a maximum vessel speed. For example, the system may be configured to display the output limit as a maximum motor RPM and/or a maximum vessel speed and to generate an alert to a user, which may be an auditory, visual, and/or haptic alert, when the user is exceeding the output limit.

Figure 2:
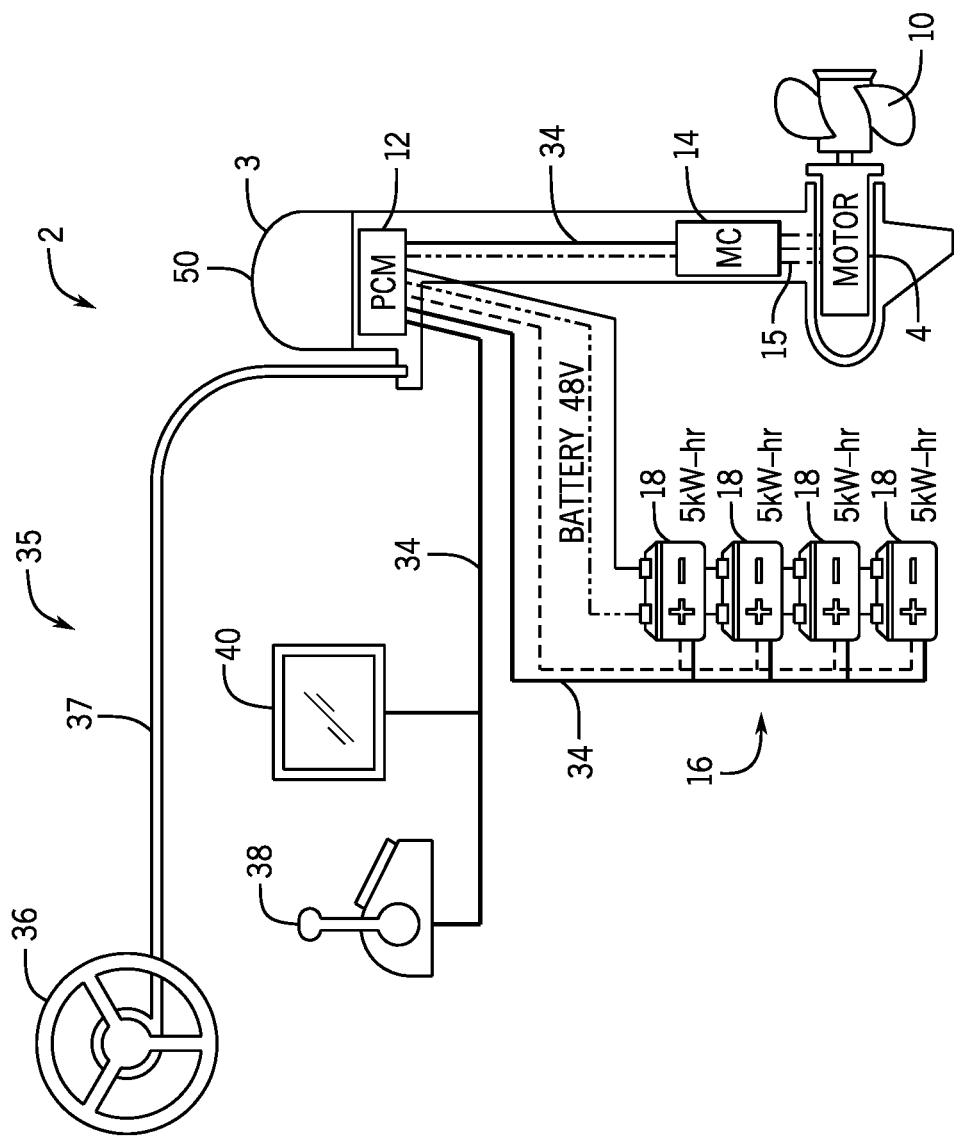
FIG. 2 is a schematic of another exemplary electric marine propulsion system in accordance with the present disclosure.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, the electric propulsion system 2 includes at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stern drives. The electric marine drive 3 is powered by the scalable storage device 16, such as including a bank of batteries 18.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be a battery system including one or more batteries or banks of batteries. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20 configured to monitor and/or control aspects of the power storage system 16. The battery controller 20 may further be configured to receive information from current, voltage, and/or other sensors within the power storage system 16, such as to receive information about the voltage, current, and temperature of each battery cell or group of battery cells within the power storage system 16. For example, the battery controller 20 may receive inputs from one or more sensors within the power storage system 16, such as one or more voltage, current, and temperature sensors within a housing for the power storage system 16. Voltage sensors may be configured to sense voltage within the battery (such as cell voltage sensors configured to sense the voltage of individual cells or groups of cells in a LI battery) and one or more temperature sensors may be configured to sense a temperature within a housing of the power storage device where one or more batteries or other storage elements are located. The battery controller 20 or other controller in the system is configured to calculate a charge level, such as a state of charge, of the power storage system 16.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, the battery controller 20, and one or more motor controllers, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

In certain embodiments, various sensing devices 23-25, 26, and 28-29, may be configured to communicate with a local controller, such as the motor controller 14 or battery controller 20, and in other embodiments the sensors 23-25, 26, and 28-29 may communicate with the central controller 12 and one or more of the motor controller 14 and or battery controller 20 may be eliminated. A GPS system 55 may also be configured to determine a current global position of the vessel, track vessel position over time, and/or determine vessel speed and direction of travel, and to provide such information to the controller 12. Alternatively or additionally, vessel speed may be measured by a speed-over-water sensor such as a pitot tube or a paddle wheel and such information may be provided to the controller 12. Controllers 12, 14, 20 (and or the various sensors and systems) may be configured to communicate via a communication bus such as a CAN bus or a LIN bus, or by single dedicated communication links between controllers 12, 14, 20.

Sensors may be configured to sense the power, including the current and voltage, delivered to the motor 4. For example, a voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4. In the depicted example, the current sensor 29 and voltage sensor 28 may be communicatively connected to the motor controller 14 to provide measurement of the voltage supplied to the motor and current supplied to the motor. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, voltage sensor 28, and current sensor 29 may be integrated into a housing of the electric motor 4, in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a temperature sensor 23 configured to sense a temperature of the motor 4, a speed sensor 24 configured to measure a rotational speed of the motor 4 (motor RPM), and a torque sensor 25 for measuring the torque output of the motor 4. A propeller speed sensor 26 may be configured to measure a rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

The central controller 12, which in the embodiment shown in FIG. 2 is a propulsion control module (PCM), communicates with the motor controller 14 via communication link 34, such as a CAN bus. The controller also receives input from and/or communicates with one or more user interface devices in the user interface system 35 via the communication link, which in some embodiments may be the same communication link as utilized for communication between the controllers 12, 14, 20 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steer arrangements, such as various steer-by-wire arrangements, are well-known in the art and could alternatively be implemented.

The various parameters of the electric propulsion system are utilized for providing user-controlled or automatically effectuated vessel power control functionality appropriate for optimizing power usage. The system may be configured to control power usage by the electric propulsion system 2 to prevent running out of power prior to traveling the user-set distance and to continue at least low speed propulsion of the marine vessel sufficient to complete the distance. The system may be configured to operate in a variety of user-selectable power modes, including a distance mode where the control system 11 operates to impose limits on motor output or power consumption enable the marine vessel to travel the user-set distance without recharging the power storage system.

The power storage system 16 may further be configured to power auxiliary devices 60 on the marine vessel 1 that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

The system may present the user with a plurality of power mode options selectable by a user, which may include options for a full power mode where the user has full power authority, a distance control mode where the system limits power usage in order to enable the vessel to travel a user-set distance on the remaining battery power, and a time control mode where the system limits power usage in order to enable the vessel to travel a user-set time on the remaining battery power. Power consumed by and/or supplied to the motor 4, and/or the electric marine drive 3 more generally, are then controlled according to the user's selected mode. Alternatively, the mode may be automatically selected and engaged by the control system 11, such as based on the charge level of the power storage system 16, the distance of the marine vessel from shore or from a predetermined location, the energy consumption history of the electric marine drive 3, and/or other factors.

Figure 3:
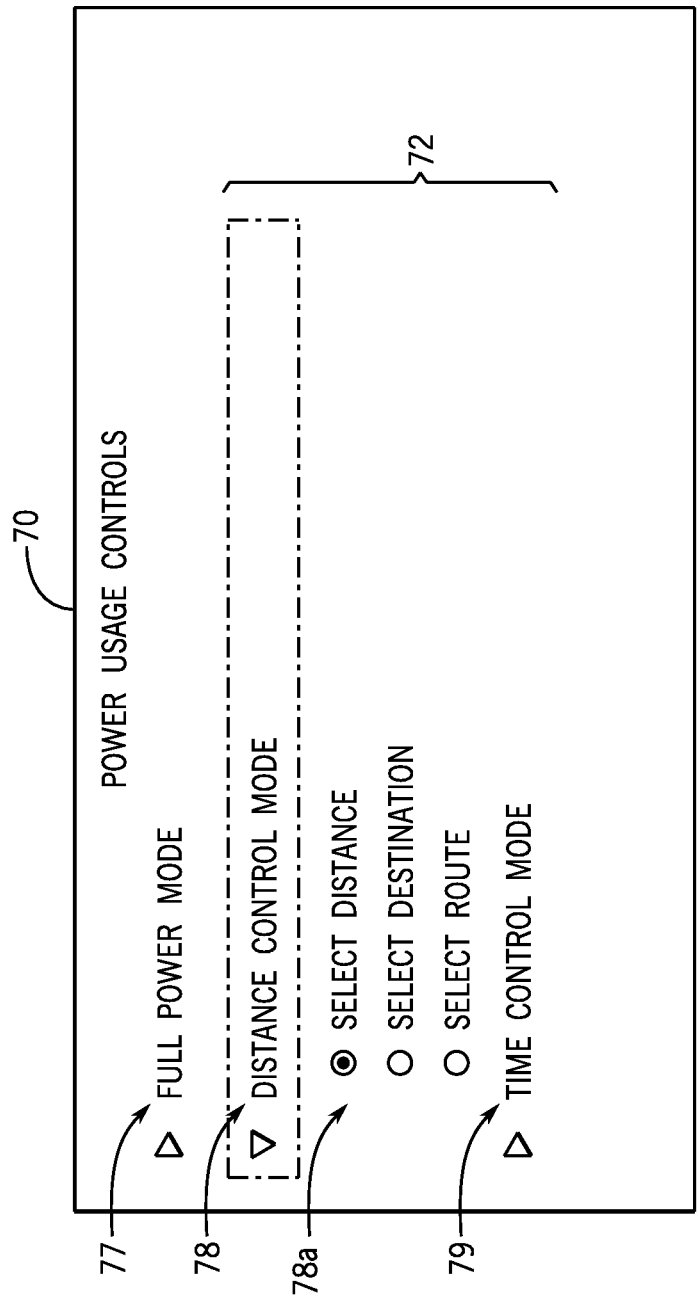
FIG. 3 is an exemplary display embodiment for mode selection in accordance with the present disclosure.

FIG. 3 depicts an exemplary user interface display 70, such as may be shown on the display device 40 of the user interface system 35. The user interface display 70 is configured to present a plurality of power mode options selectable by a user. In the depicted example, the power mode options 72 include a full power mode option 77 providing full power utilization control authority to the user, a distance control mode option 78 where the control system 11 acts to determine and/or impose an output limit to enable the marine vessel to travel the user-set distance without recharging the power storage system, and a time control mode option 79 where the control system 11 acts to determine and/or impose an output limit to enable the marine vessel to travel the user-set time period without recharging the power storage system.

In certain embodiments, the system may be further configured to allow a user to select and input various formats for the user-set distance or user-set times. In FIG. 3, upon selection of the distance control mode option 78, the user is prompted to select a distance format between a distance value (e.g., a distance in miles or kilometers), a destination (e.g., an address, map location, or GPS location), or a route (e.g., one or more waypoints or a round trip to and from a destination). Exemplary distance format selections 78a illustrated in FIG. 3 enable a user to select a dial box between inputting a distance value, a select destination, and a select route. Upon such selection, the user interface may be configured to prompt a user to then input the selected information in an appropriate format based on the selection.

The propulsion system is then controlled to enable the marine vessel to travel the user-set distance. Alternatively or additionally, the control system 11 may be configured to control power to one or more auxiliary devices in order to enable the marine vessel to travel the user-set distance. The power consumption by some or all of the auxiliary devices may be controllable, such as by a power controller 62 associated with each controlled auxiliary device or a group of auxiliary devices (FIG. 1). The power controller 62 is communicatively connected to the controller 12, or is otherwise communicating with one or more controllers in the control system 11, in order to control power consumption by such auxiliary devices. For example, the power controller 62 may be configured to communicate with one or more power monitoring or other control devices via CAN bus or LIN bus, and to then control operation of the auxiliary device and/or power delivery to the auxiliary device according to received instructions. For instance, the system may be configured to reduce power delivery to the device(s) 60, or to selectively turn off the auxiliary device(s) 60 by turning on or off power delivery to the device(s) 60 associated with the power controller 62 based on the engaged power control mode, such as when the distance control mode is engaged to enable the marine vessel to travel the user-set distance. For instance, the power controller 62 may be configured to instruct power-down of the auxiliary device or to otherwise cut power thereto to turn off one or more auxiliary devices 60. Alternatively or additionally, the power controller 62 for one or a set of auxiliary devices may include a battery switch controlling power thereto. The control system 11 may thus include digital switching system configured to control power to the various auxiliary devices, such as a CZone Control and Monitoring system by Power Products, LLC of Menomonee Falls, WI Other examples of power control arrangements are further exemplified and described at U.S. application Ser. Nos. 17/009,412 and 16/923,866, which are each incorporated herein by reference in its entirety.

The control system 11 may be configured to select certain auxiliary device(s) 60 that get turned off or otherwise controlled to reduce or eliminate power consumption by those device(s). For example, the controller 12 may be configured with a list of one or more auxiliary devices 60 that gets turned off for each power-limited mode, including the distance control mode, time control mode, and the like. Each power mode, for example, may be associated with one or more lists of auxiliary device(s) 60 that gets turned off, and similarly differing lists may be associated with various battery charge levels and/or with various distance error values. For example, the system 11 may be configured to turn off certain non-essential auxiliary devices that are not essential to the operation of the propulsion system when the battery charge level reaches a low threshold and/or when the distance error reaches a high threshold. For example, those devices that are not important for optimized vessel operation, such as entertainment devices or other accessories, or non-essential devices that draw signification power, such as climate control devices and water heaters, may be automatically turned off by the control system or the user interface display may be controlled to instruct a user to turn off one or more of such devices.

Figure 4:
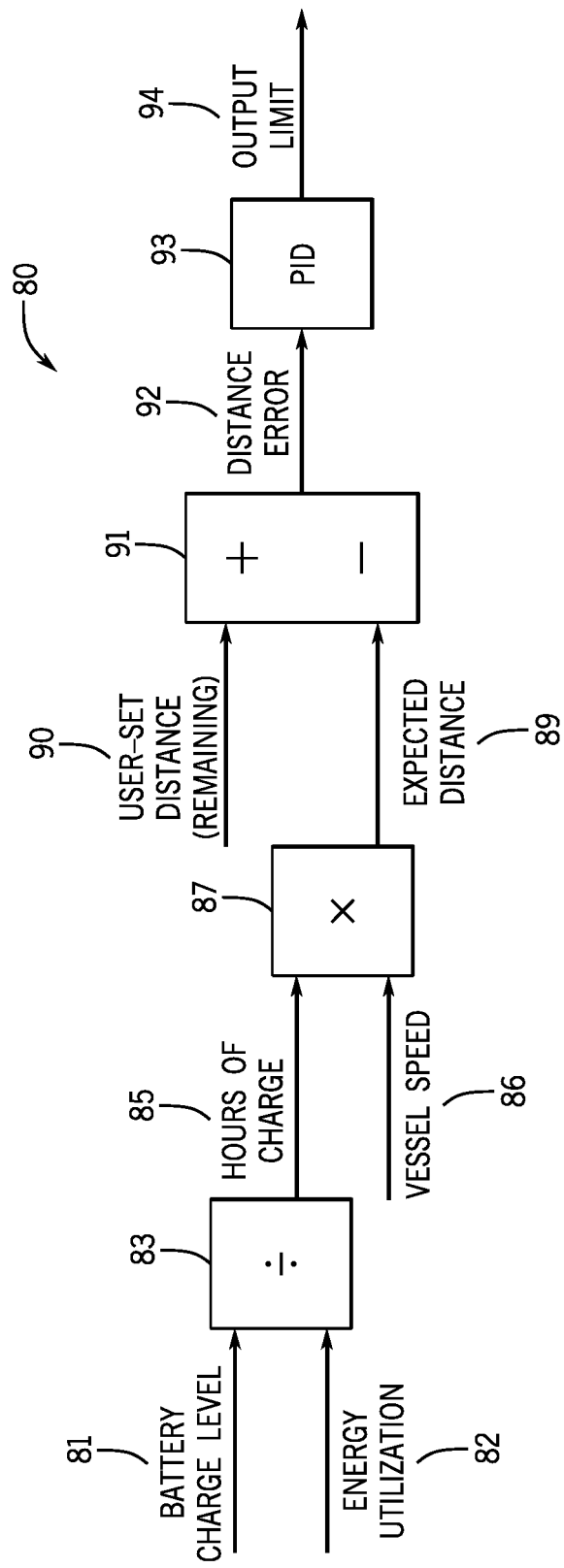
FIG. 4 is a control diagram illustrating an exemplary method for controlling an electric marine propulsion system in accordance with the present disclosure.

The control diagram at FIG. 4 illustrates an exemplary control routine 80 executed by the control system 11 for controlling the propulsion system 2. Battery charge level 81 and energy utilization 82 are received as inputs to the control method. Vessel speed 86 and user-set distance 90 are also inputs. Battery charge level indicates an amount of energy stored in the power storage system 16. For example, battery charge level 81 may be the current battery capacity in watt hours or amp hours. Alternatively, battery charge level may be received as a state of charge value, or some other value representing the amount of energy currently available from the battery. The energy utilization value 82 represents the amount of energy being drawn from the battery under current conditions. The energy utilization value 82 may be, for example, a current draw value (such as in Amps) or a power draw value (such as in Watts) determined or measured based on energy being supplied from the power storage system 16. In certain embodiments, the energy utilization value 82 may be a filtered value based on measurements taken over a period of time, such as a filtered power draw value or a filtered current draw value. For example, the filtered energy utilization value may be determined based on a first order filtering of battery current draw values or battery powered draw values measured over a period of time.

Calculation function 83 is executed to determine a remaining charge duration 85 based on the battery charge level 81 and the energy utilization value 82, such as a remaining duration in hours of battery charge at the current utilization rate. For example, where the battery charge level is a battery power level in watt hours, the energy utilization value 82 may be provided as a current power draw measurement or filtered power draw in watts, which can be divided to yield charge duration 85 in hours. Similarly, where remaining battery capacity value is presented in amp hours, the energy utilization value 82 may be presented in current draw or filtered current draw in Amps, which can likewise be divided to yield the remaining charge duration 85 in hours.

Vessel speed 86 represents the current speed of travel of the marine vessel, such as in miles per hour or kilometers per hour, but may also be a filtered speed determined based on vessel velocity measurements taken over time. For example, the vessel speed 86 may be represented as a first order filtered value or as an average measured speed over a predetermined period of time.

Calculation function 87 is executed to determine an expected distance 89 based on the remaining charge duration 85 and vessel speed 86. The expected distance 89 is the distance that the marine vessel is expected to travel based on the current conditions, including the current battery charge level, 81, the current energy utilization value 82, and the current vessel speed 86. For example, the expected distance 89 may be presented in miles or kilometers.

The user-set distance 90 is then utilized, along with the expected distance 89 to determine at step 91 a distance error 92. The user-set distance 90 represents the distance that the user has instructed to travel without recharging the power storage system 16. In certain embodiments, the control system may be configured to track a distance traveled or a distance to a set destination or route end and to utilize the remaining distance of the user-set distance to determine the distance error. As described above, the user-set distance may be provided in various formats from the user, such as a selected distance (e.g., in miles or kilometers), a selected destination from a current position, or a selected route. Where the user input is a selected destination or selected route, the user-set distance may be calculated based on a current location of the marine vessel such as a current GPS location received from the GPS system 55. Alternatively, where the user has inputted selected distance measurement, the control system may be configured to track distance traveled (such as via input from the GPS 56) to determine a distance remaining to reach the user-set distance.

The distance error 92 is calculated based on the user-set distance 90 and the expected distance 89, such as a difference between the remaining distance and the expected distance 89. Where the expected distance 89 is greater than the remaining distance 90, a distance error 92 is a positive value indicating that the energy utilization must be decreased so as to enable the marine vessel to travel the user-set distance based on the available battery charge.

An output limit 94 is calculated based on the distance error 92, where the output limit limits user authority over propulsion, and thus energy used by the propulsion system, to conserve energy as necessary to enable the marine vessel to travel the user-set distance on the stored battery power. In the depicted example, the distance error 92 is provided as input to a proportional integral derivative (PID) controller 93 which calculates the output limit 94 based on the distance error 92. The PID controller 93 may be configured to determine the output limit 94 set point as any of various parameters that effectively limit power utilization by the propulsion system 2. As described above, the output limit 94 may be generated as a motor speed limit, a motor torque limit, a motor current limit, a motor power limit, a vessel speed limit, or a helm demand limit, where the user authority of the forgoing parameter is limited by the maximum value dictated by the output limit. Sensors are configured to measure a corresponding value of the propulsion system to provide feedback to the PID controller 93 so as to enable closed-loop control.

Figure 5:
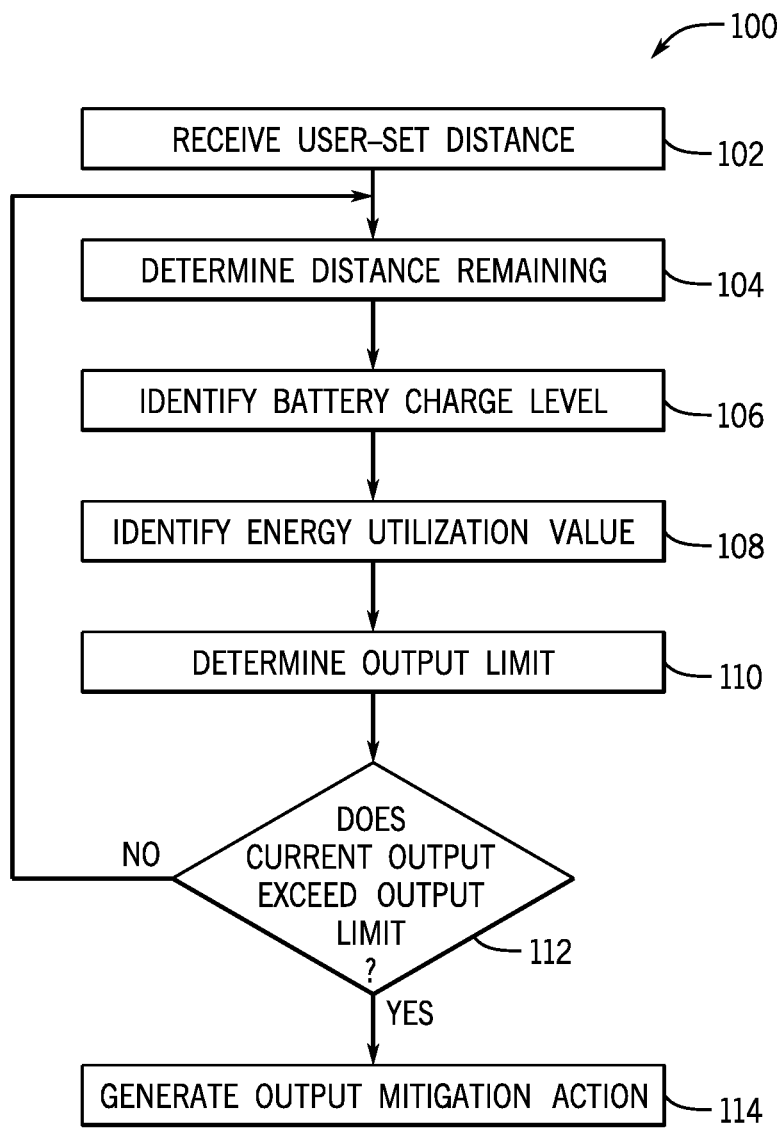
FIGS. 5-7 are flowcharts exemplifying methods, or portions thereof, for controlling an electric marine propulsion system in accordance with the present disclosure.
Figure 6:
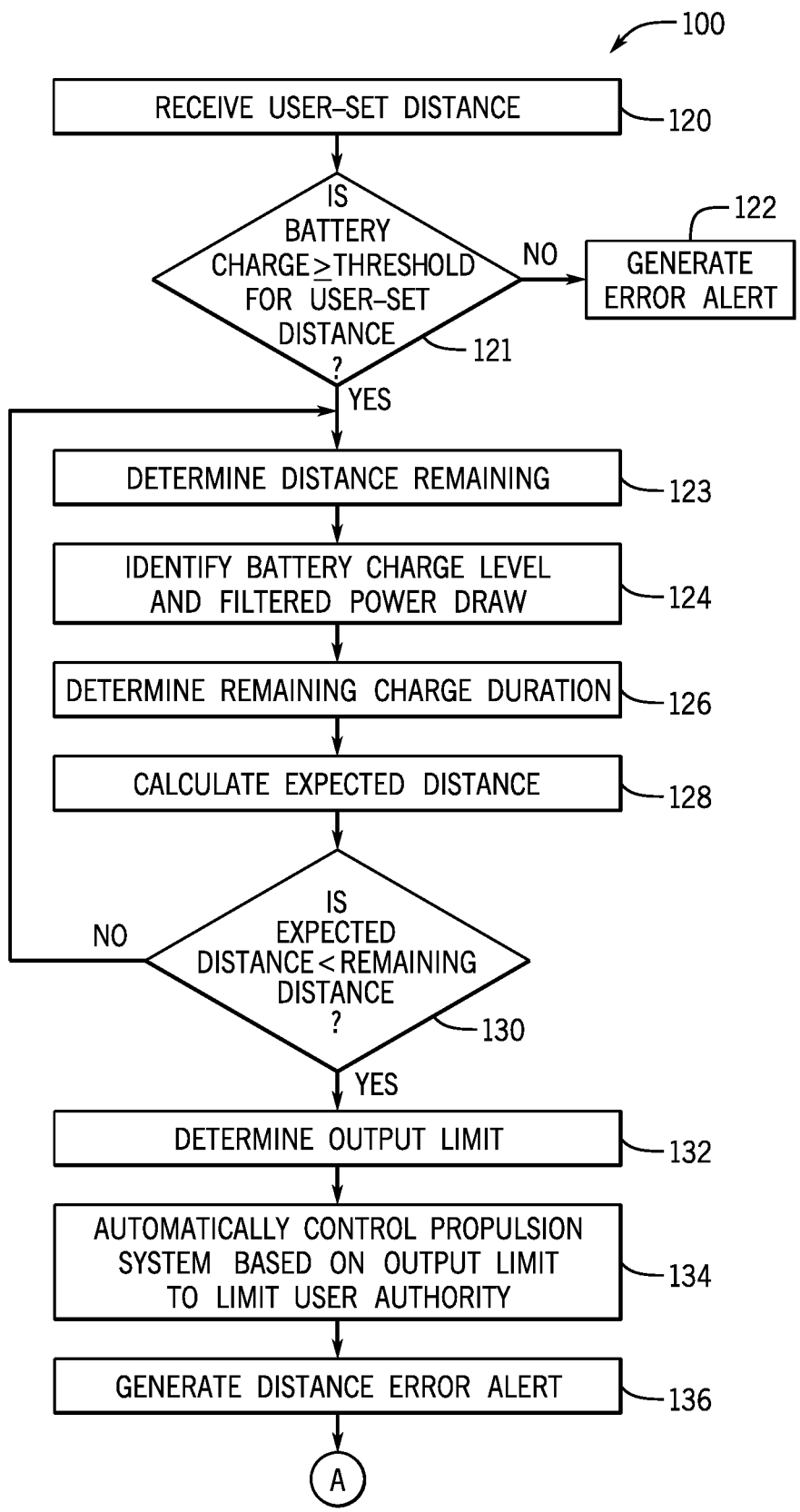
Figure 7:
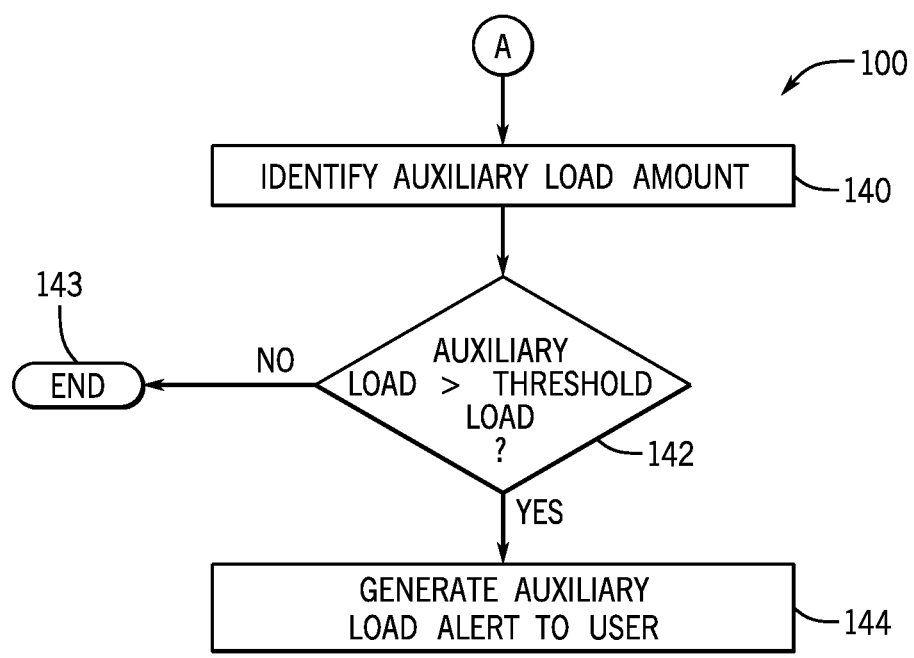

FIGS. 5-7 are flow charts illustrating exemplary methods 100, or portions thereof, for controlling electric marine propulsion to enable the marine vessel to travel the user-set distance without recharging the power storage system in accordance with the present disclosure. In certain embodiments, the methods 100 may be engaged or initiated upon a user selecting the distance control mode 78 via the user interface display 70, which may then prompt the user to set a distance.

The user-set distance is received at step 102, which may be set or determined based on various user input formats as described above. A remaining distance is determined at step 104 based on a distance already traveled by the marine vessel—i.e., how much further the marine vessel needs to travel to reach the user-set distance. The battery charge level is identified or received at step 106, such as in cooperation with the battery controller 20 and/or sensors associated with the power storage system 16. The energy utilization value is identified or received at step 108, such as in cooperation with the battery controller 20 and/or the current sensor 28 or voltage sensor 29.

The output limit is then determined at step 110, such as by calculating charge duration 85, expected distance 89, and/or distance error 92. Step 112 is then executed to determine whether a current output of the propulsion system exceeds the output limit. If not, then the user input is within the range of user authority and the control algorithm reverts back to step 104 continues determining the output limit based on current conditions and remaining distance in order to enable the marine vessel to travel the user-set distance. If the output limit is exceeded at step 112, then an output mitigation action is generated at step 114, which may include controlling the user interface to advise a user that the output limit is exceeded and/or may include automatically effectuating the limit to bring the output of the propulsion system down to the output limit regardless of the user input.

In certain embodiments, the system may be configured to calculate the output limit and instruct a user on how to control the propulsion system so as not to exceed the output limit. For example, the output limit may be calculated as maximum vessel speed or a maximum motor RPM, and the user interface display may be controlled to provide user instructions for maintaining the propulsion system within the output limit and/or for reducing the vessel speed or motor RPM when the output limit is exceeded.

FIG. 6 depicts another embodiment of a method 100 of controlling an electric marine propulsion system 2 to enable the marine vessel to travel a user-set distance without recharging the power storage system 16. The user set distance is received at step 120 and prior to initiating the distance control method, a threshold check is performed to determine whether sufficient battery charge remains to travel the user-set distance under reasonable constraints and conditions. In the depicted example, step 121 is conducted to determine whether the battery charge level is at least a threshold charge level based on the user-set distance. If the threshold is not met, then an error alert is generated at step 122 to notify a user that there is insufficient available remaining battery power to travel the desired distance. So long as the remaining battery power is sufficient, then the system enters the distance control mode where it limits output to enable the marine vessel to travel the user-set distance.

For example, the control system 11 may be configured to determine the threshold charge level as a threshold charge capacity per distance increment, such as a minimum watt hour per mile. For example, the minimum charge level per distance may be set based on the average or estimated charge capacity utilized to propel the marine vessel 1 mile, or to propel the marine vessel 1 mile under predetermined conditions, such as at a predetermined mid-range motor torque or motor rpm. The threshold may be calculated by the control system 11 based on past performance and measured values, or may be a predefined fixed value configured for the system.

The remaining distance is calculated at step 123. A battery charge level representing the amount of energy stored in the power storage system 16 and a filtered power draw value representing the current power utilization from the power storage system 16 is determined at step 124. The filtered power draw value may be the total battery power being utilized by all systems on the marine vessel, including auxiliary devices 60 and the propulsion system 2. The remaining charge duration is determined at step 126 based on the battery charge level and the filtered power draw. Examples of such a determination are described above with respect to FIG. 4. The expected distance is then calculated at step 128, such as according to the steps described above in FIG. 4.

Step 130 is executed to determine whether the expected distance is less than the remaining distance, meaning that the marine vessel will not be able to travel the user-set distance by maintaining the current conditions. If the expected distance is greater than the user-set distance, then the system returns to step 123 and monitors the expected distance and compares it to the remaining distance. If the expected distance is less than the remaining distance at step 130, then an output limit is determined at step 132 whereby the output limit is a value that increases the calculated expected distance value to at least the remaining distance. The propulsion system is then automatically controlled at step 134 based on the output limit to limit user authority over propulsion such that excessive battery power is not utilized that would prevent propelling the marine vessel to the user-set distance. A distance error alert is generated at step 136 when and if the user authority is limited to advise the user that the propulsion demand they have inputted is not being effectuated to conserve battery power in the distance control mode.

In certain embodiments, the system may be further configured to monitor an auxiliary load amount by one or more auxiliary devices 60 and to alert a user and/or automatically control power to the auxiliary devices to limit the auxiliary load and limit or draw from the battery. In the example at FIG. 7, when an expected distance is less than the remaining distance, control system may be configured to execute steps to alleviate the auxiliary load amount. An auxiliary load amount is identified at step 140. The auxiliary load amount is compared to a load threshold at step 142. For example, the load threshold may be determined to represent a minimum power draw needed for operating certain auxiliary devices on the marine vessel. The threshold load may also be an adjustable amount determined based on various factors such as a difference between the expected distance and the remaining distance and/or based on the battery charge level 81. For example, the threshold load may be decreased as the expected distance further exceeds the remaining distance and/or as the battery charge level drops below a threshold low charge level. If the auxiliary load does not exceed the threshold, then no action is taken at step 143. If the auxiliary load exceeds a threshold load at step 142 then an auxiliary load alert is generated to the user at step 144. For example, the auxiliary load alert may be generated on the user interface 35 to advise the user to turn off high load devices, such as climate control systems and/or entertainment systems, that are not required or evolved in propulsion control, guidance, navigation, etc. Alternatively or additionally, one or more auxiliary devices may be automatically turned off or operation reduced utilizing the power controller 62, as described above.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling an electric marine propulsion system configured to propel a marine vessel, the method comprising:
   receiving a user-set distance;
   determining a remaining distance based on the user-set distance;
   identifying a battery charge level of a power storage system on the marine vessel;
   identifying an energy utilization value;
   determining an output limit based on the remaining distance, the battery charge level, and the energy utilization value; and
   automatically controlling the propulsion system so as not to exceed the output limit to enable the marine vessel to travel the user-set distance without recharging the power storage system.

2. The method of claim 1, wherein the output limit includes at least one of a maximum motor torque and a maximum motor RPM.

3. The method of claim 1, wherein the output limit includes at least one of a maximum motor current or a maximum motor power consumed by an electric motor in the electric marine propulsion system.

4. The method of claim 1, wherein the output limit includes a maximum vessel speed.

5. The method of claim 1, wherein the output limit includes a maximum helm demand, and wherein controlling the propulsion system so as not to exceed the output limit includes limiting a demand instruction to the maximum helm demand.

6. The method of claim 1, wherein the energy utilization value is a filtered power draw value based on power drawn from the power storage system over time.

7. The method of claim 1, further comprising:
   wherein determining the output limit includes determining an expected distance based on the energy utilization value, the battery charge level, and a vessel speed.

8. The method of claim 7, further comprising determining a distance error as a difference between the remaining distance and the expected distance; and wherein the output limit is determined based on the distance error to inhibit the expected distance from becoming less than the remaining distance.

9. The method of claim 8, further comprising displaying a distance error alert on a user interface display when the expected distance is less than the remaining distance.

10. The method of claim 1, further comprising displaying the output limit on a user interface display.

11. The method of claim 1, further comprising receiving a user input to engage a distance control mode prior to determining the output limit.

12. An electric marine propulsion system configured to propel a marine vessel, the system comprising:
   a power storage system;
   at least one electric motor powered by the power storage system and configured to rotate a propulsor to propel the marine vessel;
   a control system configured to:
      receive a user-set distance;
      determine a remaining distance based on the user-set distance;
      identify a battery charge level;
      identify an energy utilization value;
      determine an output limit based on the remaining distance, the battery charge level, and the energy utilization value to enable the marine vessel to travel the user-set distance without recharging the power storage system; and
      generate an output mitigation action based on the output limit.

13. The system of claim 12, wherein the control system is further configured to require a user input to engage a distance control mode prior to determining the output limit.

14. The system of claim 12, wherein the output limit includes at least one of a maximum motor RPM of the at least one electric motor or a maximum vessel speed.

15. The system of claim 14, wherein system further includes a user interface display and the output mitigation action includes controlling the user interface display to instruct a user controlling the propulsion system to not exceed the at least one of the maximum motor RPM or the maximum vessel speed.

16. The system of claim 12, wherein the output mitigation action includes automatically controlling the propulsion system so as not to exceed the output limit.

17. The system of claim 16, wherein automatically controlling the propulsion system so as not to exceed the output limit includes controlling the electric motor so as not to exceed a maximum motor RPM, a maximum motor torque, a maximum motor current, and/or a maximum motor power.

18. The system of claim 16, wherein automatically controlling the propulsion system so as not to exceed the output limit includes limiting a demand instruction to a maximum helm demand.

19. The system of claim 12, wherein the energy utilization value is a filtered power draw value based on power drawn from the power storage system over time.

20. The system of claim 12, wherein the control system is further configured to:
   determine an expected distance based on the energy utilization value, the battery charge level, and a current vessel speed;
   determine a distance error as a difference between the remaining distance and the expected distance; and
   wherein the output limit is determined based on the distance error to inhibit the expected distance from becoming less than the remaining distance.

21. The system of claim 20, wherein the control system is further configured to display a distance error alert on a user interface display when the expected distance exceeds the remaining distance.

* * * * *